US010923240B2

(12) United States Patent
Sochor et al.

(10) Patent No.: US 10,923,240 B2
(45) Date of Patent: Feb. 16, 2021

(54) METHODS RELATED TO VALVE ACTUATORS HAVING MOTORS WITH PEEK-INSULATED WINDINGS (71) Applicant: Flowserve Management Company, Irving, TX (US)

(72) Inventors: Nathan J. Sochor, Lynchburg, VA (US); David Breeding, Lynchburg, VA (US); Kyle Ramsey, Lynchburg, VA (US)

(73) Assignee: Flowserve Management Company, Irving, TX (US)

( * ) Notice: Subject to any disclaimer, the term of this patent is extended or adjusted under 35 U.S.C. 154(b) by 171 days.

(21) Appl. No.: 15/565,643

(22) PCT Filed: Apr. 10, 2015

(86) PCT No.: PCT/US2015/025457
§ 371 (c)(1),
(2) Date: Oct. 10, 2017

(87) PCT Pub. No.: WO2016/164051
PCT Pub. Date: Oct. 13, 2016

(65) Prior Publication Data
US 2018/0075932 A1    Mar. 15, 2018

(51) Int. Cl.
*G21C 15/18* (2006.01)
*H01B 3/42* (2006.01)
(Continued)

(52) U.S. Cl.
CPC .............. *G21C 15/18* (2013.01); *G21C 9/00* (2013.01); *H01B 3/307* (2013.01); *H01B 3/40* (2013.01);
(Continued)

(58) Field of Classification Search
CPC ... H01B 3/36; H01B 3/42; H01B 7/28; H01B 7/2806; H01B 7/29; H01B 7/292; H01B 3/427; H02K 3/30
(Continued)

(56) References Cited

U.S. PATENT DOCUMENTS 3,042,595 A * 7/1962 Cobb ................. G21C 1/08
376/221
4,113,561 A * 9/1978 Fidler ................. G21C 15/18
376/299
(Continued)

FOREIGN PATENT DOCUMENTS

| CN | 1871667 A | 11/2006 |
|---|---|---|
| JP | 7-130219 A | 5/1995 |
| JP | 9-302326 A | 11/1997 |

OTHER PUBLICATIONS

Page, J.Y.S., et al. Neutron and gamma radiation effects on the viscoelastic behaviour of poly (aryl ether ether ketone). In Oliva, A. (Ed.). CNS proceedings of the 1997 CNA/CNS annual conference on powering Canada's future vol. 1, 2, (p. 1122). (Year: 1997).*

(Continued)

*Primary Examiner* — Sharon M Davis
(74) *Attorney, Agent, or Firm* — Phillips Winchester (57) ABSTRACT A method of operating a nuclear reactor includes operating a valve actuator to open and close a valve in fluid communication with a nuclear reactor fluid control system. The valve actuator includes a motor having windings of magnet wire. The magnet wire includes a layer of insulating material disposed over a conductor. The layer of insulating material comprises polyetheretherketone (PEEK) and has a thickness between about 0.025 mm and about 0.381 mm. A method of replacing a valve actuator motor with such a motor having windings formed of PEEK-insulated magnet wire is also disclosed. A method of coupling a valve actuator with such (Continued)

a motor having windings formed of PEEK-insulated magnet wire to a valve is also disclosed.

19 Claims, 5 Drawing Sheets

(51) Int. Cl.
*G21C 9/00* (2006.01)
*H01B 3/40* (2006.01)
*H01B 3/30* (2006.01)

(52) U.S. Cl.
CPC ......... *H01B 3/427* (2013.01); *B05D 2202/00* (2013.01); *Y02E 30/30* (2013.01)

(58) Field of Classification Search
USPC ...................................................... 174/110 R
See application file for complete search history.

(56) References Cited

U.S. PATENT DOCUMENTS

| | | | | |
|---|---|---|---|---|
| 4,521,485 A | * | 6/1985 | Tondre | H01B 3/30 174/110 FC |
| 4,833,354 A | * | 5/1989 | Miller | H02K 3/38 310/260 |
| 5,011,650 A | * | 4/1991 | Fero | G21C 17/00 374/159 |
| 5,319,269 A | * | 6/1994 | Bryant | H02K 3/30 310/43 |
| 2011/0127065 A1 | | 6/2011 | Park | |
| 2013/0335181 A1 | * | 12/2013 | Choi | G21C 7/10 336/96 |
| 2014/0134016 A1 | | 5/2014 | Flett | |
| 2014/0145530 A1 | | 5/2014 | Reeves et al. | |

OTHER PUBLICATIONS

Subudhi, M. et al. Improving Motor Reliability in Nuclear Power Plants, 1987, NUREG CR-4939. (Year: 1987).*
BWR Owners' Group DC Motor Performance Methodology 2000 NEDC-32958. (Year: 2000).*
"Technical information polymer characteristics" Habonim Industrial Valves and Actuators, Rev, 2.04 Apr. 2017; available at https://www.habonim.com/wp-content/uploads/2017/05/TechInfo-polymer-characteristics-2017.pdf. (Year: 2017).*
Hooker, Matthew W. et al. 'High-Temperature Motor Windings for Downhole Pumps Used in Geothermal Energy Production.' In: Technical Report of Composite Technology Development, Inc., Dec. 31, 2010, 16 pages.
International Search Report and Written Opinion for International application No. PCT/US2015/025457 dated Jan. 11, 2016, 11 pages.
International Preliminary Report on Patentability for International application No. PCT/US2015/025457 dated Oct. 10, 2017, 8 pages.

* cited by examiner

METHODS RELATED TO VALVE ACTUATORS HAVING MOTORS WITH PEEK-INSULATED WINDINGS

CROSS-REFERENCE TO RELATED APPLICATIONS

This application is a national phase entry under 35 U.S.C. § 371 of International Patent Application PCT/US2015/025457, filed Apr. 10, 2015, designating the United States of America and published in English as International Patent Publication WO2016/164051 A1 on Oct. 13, 2016, the disclosure of which is hereby incorporated herein in its entirety by this reference.

TECHNICAL FIELD

The present disclosure relates generally to valve actuators. More particularly, embodiments of the present disclosure relate to valve actuators having electric motor windings insulated to withstand the unique harsh conditions possible in a nuclear reactor system event.

BACKGROUND

Nuclear reactors are designed and constructed to withstand certain naturally occurring and non-naturally occurring events or accidents, such as earthquakes, floods, tornadoes, fires, explosions, or even criticality. Such events may result in the exposure of components of a nuclear reactor fluid control system to extreme environmental conditions, particularly any components inside the reactor containment unit. Such extreme environmental conditions may include elevated temperatures and pressures, 100 percent humidity, and exposure to corrosive chemicals.

Recent events, such as the disaster at the Fukushima nuclear power plant in Japan in March 2011, have increased awareness of the need for components of a nuclear reactor fluid control system to withstand the extreme environmental conditions occurring during or immediately after a design-basis event (DBE). A nuclear reactor fluid control system typically includes a number of components, including pumps, valves, condensers, heat exchangers, turbines, and fluid lines. A number of valves of the fluid control system may be located inside the reactor containment unit, and are thus particularly susceptible to the extreme environmental conditions of a design-basis event.

DISCLOSURE

Various embodiments of the present disclosure comprise a method of operating a nuclear reactor, the method comprising operating a valve actuator to open and close a valve in fluid communication with a nuclear reactor fluid control system. The valve actuator includes an electric motor having windings of magnet wire. The magnet wire includes a layer of insulating material disposed over a conductor. The layer of insulating material comprises polyetheretherketone (PEEK). The layer of insulating material has a thickness between about 0.025 mm and about 0.381 mm.

In one or more additional embodiments, a method of refurbishing a nuclear reactor fluid system includes replacing a valve actuator motor of a valve. The valve is configured to be in fluid communication with a nuclear reactor fluid control system. Replacing the valve actuator motor includes uncoupling a motor from the valve actuator and coupling a second motor to the valve actuator. The second motor being an electric motor. The second motor includes windings of magnet wire. The magnet wire includes a layer of insulating material disposed over a conductor. The layer of insulating material comprises polyetheretherketone (PEEK). The layer of insulating material has a thickness between about 0.025 mm and about 0.381 mm.

Additional embodiments of the present disclosure comprise a method of servicing a nuclear reactor fluid system, the method comprising coupling a valve actuator to a valve. The valve is in fluid communication with a nuclear reactor fluid control system. The valve actuator includes an electric motor. The electric motor includes windings of magnet wire. The magnet wire includes a layer of insulating material disposed over a conductor. The layer of insulating material comprises polyetheretherketone (PEEK). The layer of insulating material has a thickness between about 0.025 mm and about 0.381 mm.

DETAILED DESCRIPTION

The illustrations presented herein are, in some instances, not actual views of any particular nuclear reactor fluid control system, valve actuator, motor, windings, or magnet wire, but are merely idealized representations which are employed to describe the present disclosure. Additionally, elements common between figures may retain the same numerical designation.

Various embodiments of the present disclosure comprise fluid flow control devices, such as valve assemblies, including valve actuators and valve actuator motors.

Figure 1:
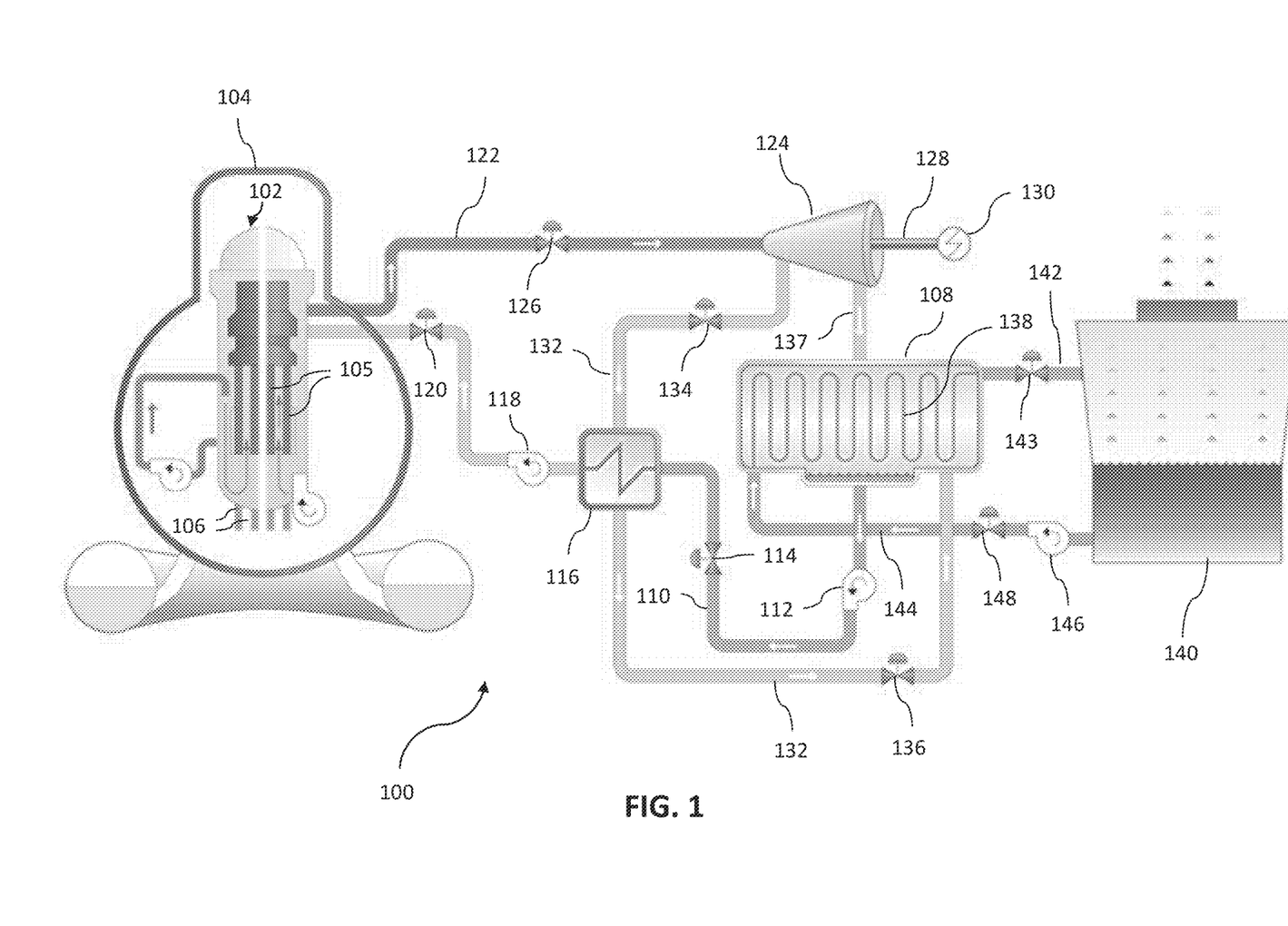
FIG. 1 illustrates a schematic plan view of a nuclear reactor fluid control system, according to an embodiment of the present disclosure.

FIG. 1 illustrates a schematic diagram of an example nuclear reactor fluid control system 100 utilizing control valve elements disclosed herein. The nuclear reactor fluid control system 100 may include a Boiling Water Reactor (BWR), as shown in FIG. 1, but may also include other types of reactors, such as a Pressurized Water Reactor (PWR), in other embodiments. With continued reference to FIG. 1, the nuclear reactor fluid control system 100 may include a reactor vessel 102 located in a containment unit 104. Fuel rods 105 may be located in the reactor vessel for heating water entering the reactor vessel 102 (i.e., such water may be termed "feedwater") into steam. Control rods 106 may be insertable into the reactor vessel 102 to halt or reduce the nuclear reaction taking place within and between the fuel rods 105. Feedwater may be delivered to the reactor vessel 102 from a condenser 108 through a feedwater line 110, which will be discussed in more detail below. Feedwater may be drawn from the condenser 108 and pressurized for delivery to the reactor vessel 102 by a condensate pump 112 located in the feedwater line 110 proximate the condenser 108. A valve 114 may be located in the feedwater line 100 between the condensate pump 112 and a heater 116 to control the flow of feedwater entering the feedwater heater 116. Feedwater exiting the heater 116 may be delivered to the reactor vessel 102 by a reactor feed pump 118 located downstream from the heater 116 in the feedwater line 110. A feedwater isolation valve 120 may be located in the feedwater line 110 between the reactor feed pump 118 and the reactor vessel 102.

After the feedwater has entered the reactor vessel 102, the feedwater may be heated by the fuel rods and converted into steam. The steam may exit the reactor vessel 102 through a steam return line 122 conveying the steam to a steam turbine 124. A steam isolation valve 126 may be located in the steam return line 122 between the reactor vessel 102 and the steam turbine 124. While the steam isolation valve 126 and the feedwater isolation valve 120 are shown as being located outside the containment unit 104, these valves 120, 126 may be located inside the containment unit 104 in other embodiments. Additionally, other valves may be located inside the containment unit 104 and may have various functions and purposes. Valves located inside the containment unit 104 may be termed "inside containment" valves.

The steam turbine 124 may convert the thermal energy from the pressurized steam into rotation energy. An output shaft 128 of the steam turbine 124 may be coupled to, and drive, a power generator 130.

Some of the condensed steam exiting the steam turbine 124 may be conveyed directly back to the feedwater heater 116 through a first condensate line 132. A valve 134 may be located in the first condensate line 132 between the steam turbine 124 and the feedwater heater 116 and may regulate the flow of condensed steam therebetween. The condensed steam delivered to the feedwater heater 116 through the first condensate line 132 heats the feedwater entering the feedwater heater 116 from the condenser 108 through the feedwater line 110. The first condensate line 132 conveys the condensed steam exiting the feedwater heater 116 to the condenser 108. A valve 136 may be located in the first condensate line 132 between the feedwater heater 116 and the condenser 108 and may regulate the flow of condensed steam therebetween. The remainder of condensed steam exiting the steam turbine 124 may be returned directly to the condenser 108 through a condensate return line 137. Once inside the condenser 108, the condensed steam may be further condensed into liquid water by cooling water flowing through cooling tubes 138 within the condenser 108. Cooling water in the cooling tubes 138 of the condenser 108 heated by the condensed steam from the steam turbine 124 may be delivered to a cooling tower 140 through a cooling water return line 142. A valve 143 may regulate flow of cooling water in the cooling water return line 142 between the condenser 108 and the cooling tower 140. Condensed and cooled cooling water from the cooling tower 140 may be circulated back to the cooling tubes 138 of the condenser 108 through a cooling water line 144 by a pump 146. A valve 148 may be located in the cooling water line 144 between the pump 146 and the condenser 108 and may regulate the flow of cooling water from the cooling tower 140 to the condenser 108.

Figure 2:
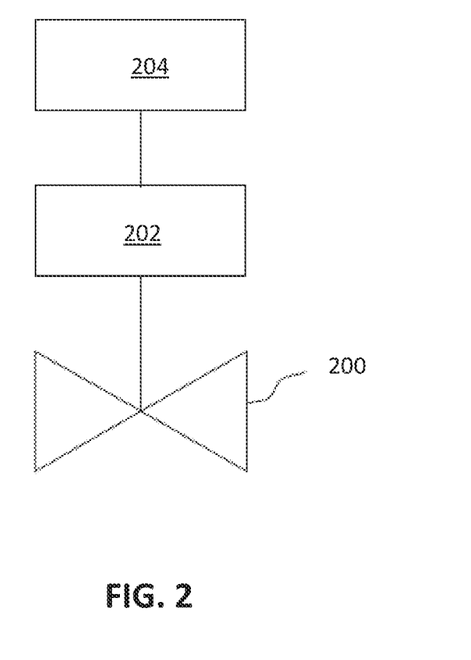
FIG. 2 illustrates a diagram view of a valve assembly, according to an embodiment of the present disclosure.

It is to be appreciated that some or all of the valves of the fluid control system 100, including valves 114, 120, 126, 134, 136, 143 and 148, may be control valves. FIG. 2 illustrates an example control valve 200 according to an embodiment of the present disclosure. A control valve 200, such as shown in FIG. 2, may be utilized for any of the valves 114, 120, 126, 134, 136, 143 and 148 shown in FIG. 1. With continued reference to FIG. 2, the control valve 200 may include a valve body having a closure element (not shown), such as a plug head, disposed therein. A stem (not shown) of the closure element may be operatively coupled to a valve actuator 202 that opens and closes the closure element of the valve 200. The valve actuator 202 may be driven by a motor 204 (commonly referred to in the art as a "Valve Actuator Motor" (VAM)); thus, the valve 200 may be termed a Motor Operated Valve (MOV). The motor 204 may be a DC compound wound electric motor or an AC three-phase electric motor. In other embodiments, other types of motors may be incorporated as the motor 204 of the valve 200. Because MOV applications often require intermittent use, the motor 204 may be a short term duty motor.

Figure 3:
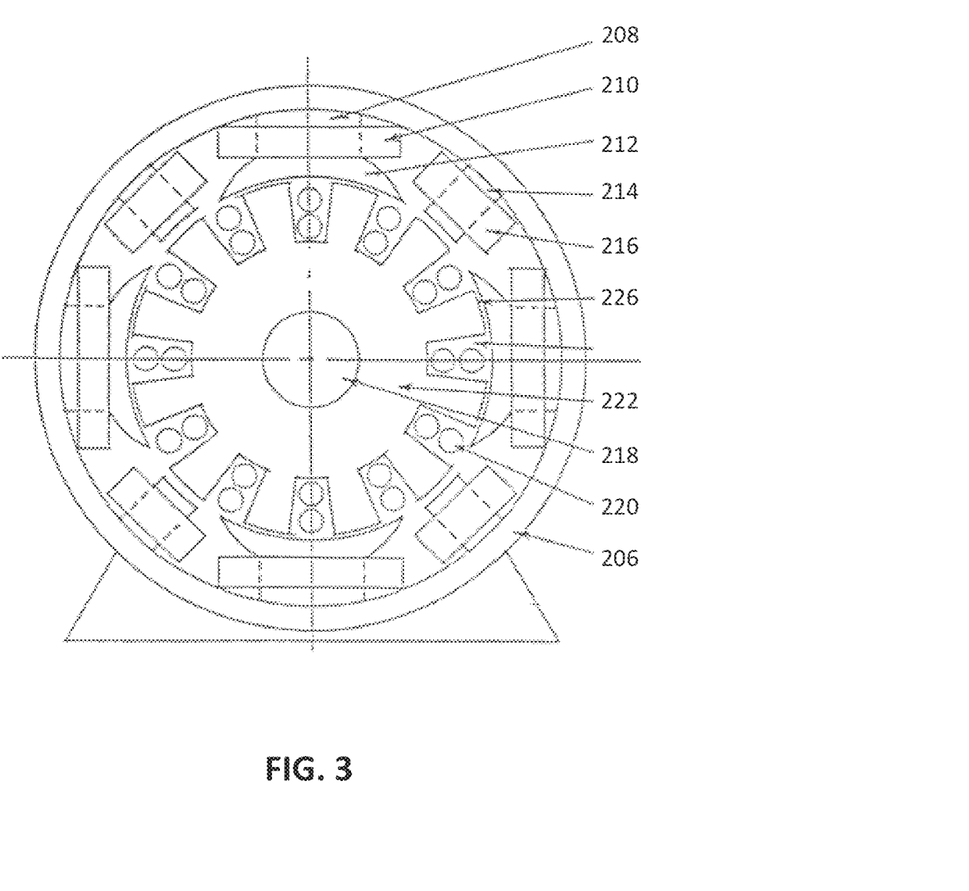
FIG. 3 illustrates an elevation view of an electric motor, according to an embodiment of the present disclosure.

FIG. 3 illustrates an example valve actuator motor 204 for use with the valve actuator 202 of FIG. 2. The motor 204 is shown as a four-pole, DC compound wound motor; however, it is to be appreciated that the motor 204 may be a bi-polar motor or a multi-polar motor with more than four poles. Additionally, in other embodiments, the motor 204 may be an AC motor, such as an AC three-phase motor. It is to be appreciated that the motor 204 may be any type of valve actuator motor suited for use in a nuclear reactor fluid control system.

With continued reference to FIG. 3, the motor 204 may include a frame 206 supporting main field poles 208 with main field coil windings 210 wound about the poles 208. Pole heads 212 may extend radially inward from the main field poles 208. The frame 206 may also support a plurality of interpoles 214 located circumferentially between the main field poles 208. Interpole coil windings 216 may be wound about the interpoles 214. The main field poles 208, the main field coil windings 210, the pole heads 212, the interpoles 214 and the interpole coil windings 216 may be collectively referred to as the "field windings" 217 of the motor, and may be coupled to the frame 206 in a stationary manner. In an AC motor, the stationary components of the motor may be collectively termed the "stator," which may include stator coil windings.

Figure 4:
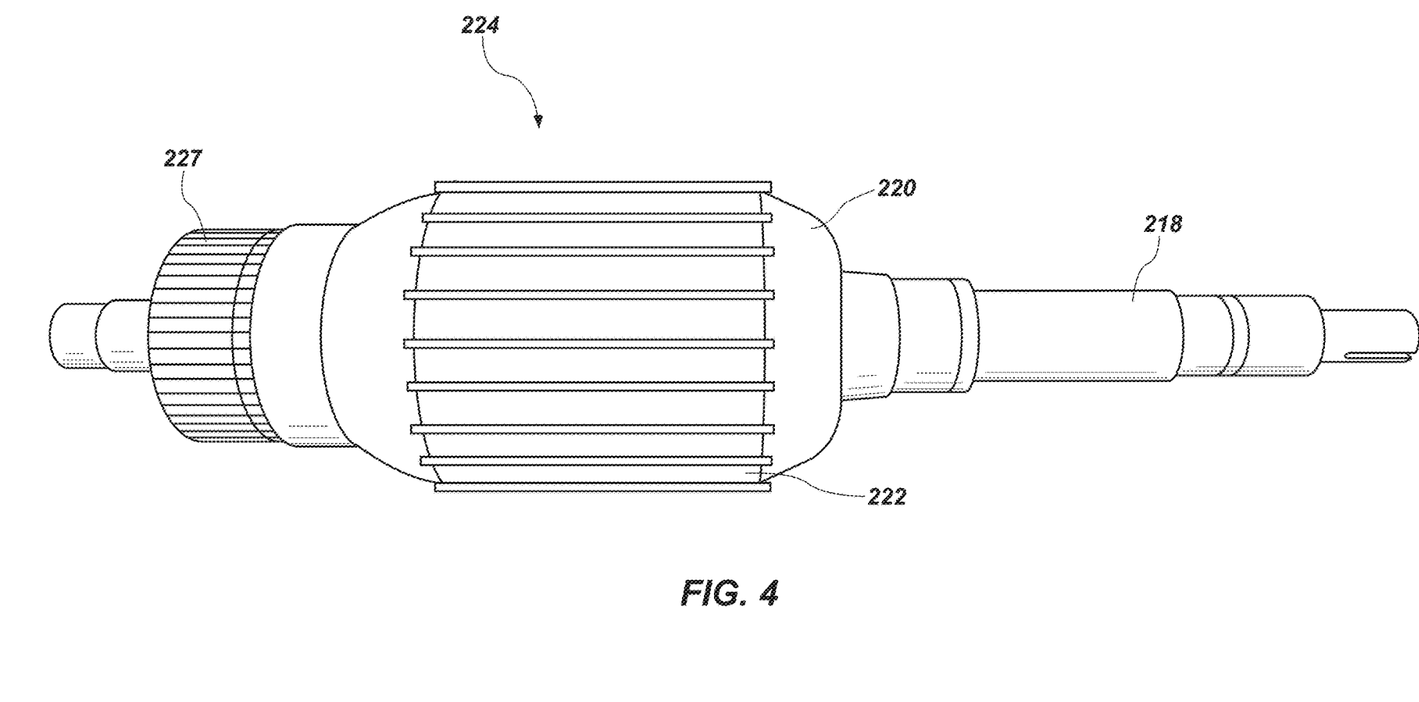
FIG. 4 illustrates a perspective view of an armature of an electric motor, according to an embodiment of the present disclosure.

With continued reference to the DC motor 204 shown in FIG. 3, a rotatable shaft 218 may be centrally located within the frame 206 and may carry armature coil windings 220 in an armature stack 222, as shown in FIG. 4. The shaft 218, the armature coil windings 220 and the armature stack 222 may collectively be termed the "armature" 224 of the motor 204. As shown in FIG. 3, a narrow air gap 226 is located between an outer diameter of the armature stack 222 and an inner surface of the pole heads 212. The armature 224 (FIG. 4) may also include a commutator 227 for providing current to the armature 224. Electric current supplied to the main field coil windings 210, the interpole coil windings 216 and the armature coil windings 220 cause the armature 224 to rotate under influence of the magnetic fields in the motor 204, generating power in the form of rotational energy that may be used to power the valve actuator 202. In an AC motor, the rotating component(s) may be termed the "rotor," which may include rotor coil windings.

The windings of the motor 204 of FIG. 3—including the field coil windings 210, the interpole coil windings 216 and the armature coil windings 220—may comprise enameled copper wire, termed "magnet wire," but may also comprise wire formed from other suitable materials, such as, by way of non-limiting example, aluminum and silver. In an AC motor, the stator coil windings and the rotor coil windings may also comprise magnet wire or other suitable materials, such as aluminum and silver.

To protect the windings of the motor 204 of FIG. 3—including the field coil windings 210, the interpole coil windings 216 and the armature coil windings 220 (or, in an AC motor, the stator coil windings and the rotor coil windings)—from the harsh operational environment of a nuclear reactor fluid control system 100 (FIG. 1), the coil windings 210, 216, 220 of the motor 204 may be protected by a layer of insulating material. This insulating material may also serve as an electrical insulation for the wire conductors.

Nuclear reactors are designed and constructed to withstand a design basis event (DBE), which is defined as a postulated event or accident used in the reactor design to establish the acceptable performance requirements of the structures, systems and components necessary to assure public health and safety. DBEs may include natural events, such as earthquakes, floods and tornadoes. DBEs may also include non-naturally occurring events, such as explosions, fires, criticality, or other such events, such as a loss of coolant accident (LOCA), high energy line break (HELB) or a main steam line break (MSLB). DBEs often result in extreme environmental conditions on the reactor fluid control system 100 (FIG. 1), particularly inside the containment unit 104. Such extreme environmental conditions may include elevated temperatures and pressures, 100 percent humidity, and exposure to corrosive chemicals. For example, a loss of coolant accident, high energy line break or a main steam line break may result in exposure of components of the fluid control system, including valves, actuators and motors, to an environment including temperatures in excess of 120 degrees Celsius (about 250 degrees Fahrenheit), pressures greater than 0.344 MPa (about 50 psi), and 100 percent saturated steam for extended periods of time, including twenty-four hours or longer. Additionally, the environment to which components of the fluid control system may be exposed may include corrosive chemicals, such as a boric acid spray or a sodium hydroxide spray, which may be used to halt radioactive decay of materials contaminated during or following a DBE.

Figure 5:
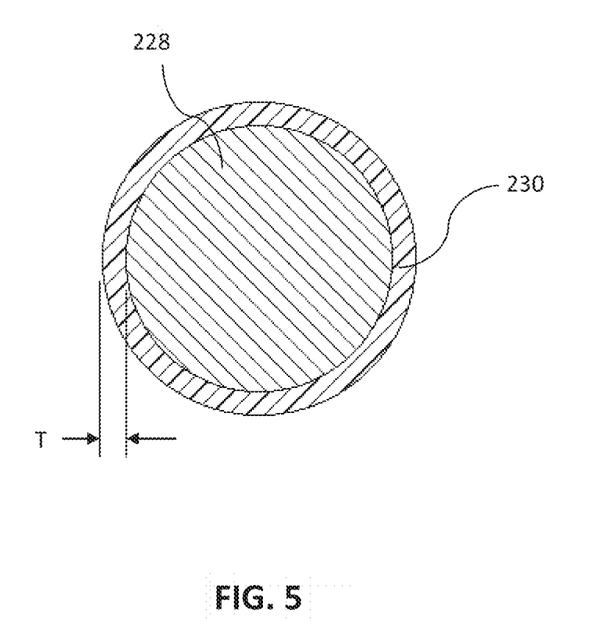
FIG. 5 illustrates a transverse cross-sectional view of one of the magnet wires.

Referring now to FIG. 5, an enlarged view of a magnet wire conductor 228 is shown having a layer of insulating material 230 disposed thereon and configured to provide an electrically non-conductive barrier to isolate the magnet wire conductor 228 from the neighboring coil turns in the winding and to maintain this isolation during and after the harsh conditions of a DBE. The layer of insulating material 230 may comprise a thermoplastic polymer, such as polyetheretherketone ("PEEK"). The layer of insulating material 230 may be extruded over the magnet wire conductor 228 and may substantially circumferentially and longitudinally envelope the magnet wire conductor 228.

A magnet wire conductor 228 sized according to the classifications of American Wire Gage (AWG) 4 through 32 may have a layer of insulating material 230 with a thickness in the range of about 0.010 mm ($3.94 \times 10^{-4}$ inch) and about 0.70 mm (0.0276 inch). For example, in some embodiments, the layer of insulating material 230 may have a thickness in the range between about 0.010 mm ($3.94 \times 10^{-4}$ inch) and about 0.025 mm ($9.84 \times 10^{-4}$ inch). In other embodiments, the layer of insulating material 230 may have a thickness in the range of about 0.025 mm ($9.84 \times 10^{-4}$ inch) and about 0.10 mm (0.00394 inch). In yet other embodiments, the layer of insulating material 230 may have a thickness in the range of about 0.10 mm (0.00394 inch) and about 0.20 mm (0.00787 inch). In further embodiments, the layer of insulating material 230 may have a thickness in the range of about 0.20 mm (0.00787 inch) and about 0.381 mm (0.015 inch). In yet further embodiments, the layer of insulating material 230 may have a thickness in the range of about 0.381 mm (0.015 inch) and about 0.70 mm (0.0276 inch). In other embodiments, the layer of insulating material 230 may have a thickness greater than about 0.70 mm (0.0276 inch).

After being formed and wound, the coils may also be treated with a resin. Such a resin may act as a binding agent for structural integrity as well as provide an additional barrier to the harsh environment that may degrade the insulating layer 230. By way of non-limiting example, the layer of insulating material 230 may be treated with a solvent-borne epoxy impregnating resin, specifically, Sterling® brand U-475 EH solvent-borne epoxy impregnating resin, available from Elantas PDG, Inc. located in St. Louis, Mo.

As set forth above, the layer of insulating material 230 may be configured to protect the functionality of the motor windings from the harsh conditions following a DBE. For example, the layer of insulating material 230 may be configured to prevent degradation of the electrical isolation barrier of the magnet wire integral to the winding when the motor 204 is exposed to temperatures greater than 120 degrees Celsius (about 250 degrees Fahrenheit) or even 260 degrees Celsius (500 degrees Fahrenheit) for durations less than five minutes, durations between five minutes and twenty-four hours, or durations longer than twenty-four hours. In other embodiments, the layer of insulating material 230 may be configured to protect the functionality of the motor windings when the motor 204 is exposed to pressures greater than 0.344 MPa (about 50 psi) for such durations. In yet other embodiments, the layer of insulating material 230 may be configured to protect the functionality of the motor windings when the motor 204 is exposed to a 100 percent saturated steam environment for such durations. In further embodiments, the layer of insulating material 230 may be configured to protect the functionality of the motor windings when the motor 204 is exposed to a boric acid spray or a sodium hydroxide spray. In yet further embodiments, the layer of insulating material 230 may be configured to protect the functionality of the motor windings when the motor 204 is exposed to any of the foregoing temperatures, pressures, humidity levels, and corrosive chemicals for any of the foregoing durations. By way of non-limiting example, the layer of insulating material 230 may be configured to protect the functionality of the motor windings when the motor 204 is exposed to a temperature of at least about 120 degrees Celsius (about 250 degrees Fahrenheit), a pressure of at least about 0.344 MPa (about 50 psi), saturated steam, and one or more of a boric acid spray and a sodium hydroxide spray for a duration of at least about five minutes.

The various embodiments of the nuclear reactor fluid control system 100, the valve actuator 202, and/or the motor 204 previously described may include many other features not shown in the figures or described in relation thereto, as some aspects thereof may have been omitted from the text and figures for clarity and ease of understanding. Therefore, it is to be understood that the fluid control system 100, the valve actuator 202, and/or the motor 204 may include many features in addition to those shown in the figures. Furthermore, it is to be further understood that the fluid control system 100, the valve actuator 202, and/or the motor 204 may not contain all of the features herein described.

Additional, nonlimiting embodiments within the scope of this disclosure include:

Embodiment 1

A method of operating a nuclear reactor, comprising: operating a valve actuator to open and close a valve in fluid communication with a nuclear reactor fluid control system, the valve actuator having an electric motor, the electric motor having windings of magnet wire, the magnet wire comprising a layer of insulating material disposed over a conductor, the layer of insulating material comprising polyetheretherketone (PEEK), the layer of insulating material having a thickness between about 0.020 mm and about 0.381 mm.

Embodiment 2

The method of Embodiment 1, wherein the layer of insulating material is configured to protect the functionality of the motor windings when the motor is exposed to temperatures between about 120 degrees Celsius and about 260 degrees Celsius.

Embodiment 3

The method of Embodiment 1 or Embodiment 2, wherein the layer of insulating material is configured to protect the functionality of the motor windings when the motor is exposed to temperatures between about 120 degrees Celsius and about 260 degrees Celsius for at least about 5 minutes in a 100 percent humidity environment.

Embodiment 4

The method of any one of Embodiments 1 through 3, wherein the layer of insulating material is configured to protect the functionality of the motor windings when the motor is exposed to a pressure of at least about 0.414 MPa for the at least 5 minutes.

Embodiment 5

The method of any one of Embodiments 1 through 4, wherein the layer of insulating material is treated with an impregnated resin.

Embodiment 6

The method of Embodiment 5, wherein the impregnated resin is a solvent-borne epoxy.

Embodiment 7

The method of any one of Embodiments 1 through 6, wherein the layer of insulating material substantially does not degrade when exposed to one or more of a boric acid spray and a sodium hydroxide spray.

Embodiment 8

A method of refurbishing a nuclear reactor fluid system, comprising: replacing a valve actuator motor of a valve, the valve configured to be in fluid communication with a nuclear reactor fluid control system, replacing the valve actuator motor comprising: uncoupling a motor from the valve actuator; and coupling a second motor to the valve actuator, the second motor being an electric motor, the second motor having windings of magnet wire, the magnet wire comprising a layer of insulating material disposed over a conductor, the layer of insulating material comprising polyetheretherketone (PEEK), the layer of insulating material having a thickness between about 0.025 mm and about 0.381 mm.

Embodiment 9

The method of Embodiment 8, wherein the layer of insulating material is extruded along the conductor.

Embodiment 10

The method of Embodiment 8 or Embodiment 9, wherein the valve is located inside a containment unit of a nuclear reactor of the nuclear reactor fluid control system.

Embodiment 11

The method of any one of Embodiments 8 through 10, wherein the second motor is a DC compound wound electric motor.

Embodiment 12

The method of Embodiment 11, wherein the windings of the electric motor include field coil windings formed of magnet wire, the windings of the motor further include armature coil windings formed of magnet wire, and the layer of insulating material is disposed on the conductor of the field coil windings and the conductor of the armature coil windings.

Embodiment 13

The method of any one of Embodiments 8 through 10, wherein the second motor is an AC three-phase electric motor.

Embodiment 14

A method of servicing a nuclear reactor fluid system, comprising: coupling a valve actuator to a valve, the valve in fluid communication with a nuclear reactor fluid control system, the valve actuator having an electric motor, the electric motor having windings of magnet wire, the magnet wire comprising a layer of insulating material disposed over a conductor, the layer of insulating material comprising polyetheretherketone (PEEK), the layer of insulating material having a thickness between about 0.025 mm and about 0.381 mm.

Embodiment 15

The method of Embodiment 14, wherein the layer of insulating material is configured to protect the functionality of the motor windings when the motor is exposed to temperatures between about 120 degrees Celsius and about 260 degrees Celsius.

Embodiment 16

The method of Embodiment 14 or Embodiment 15, wherein the layer of insulating material is configured to protect the functionality of the motor windings when the motor is exposed to temperatures between about 120 degrees Celsius and about 260 degrees Celsius for at least about 5 minutes in a 100 percent humidity environment.

Embodiment 17

The method of Embodiment 16, wherein the environment is at a pressure of about 0.344 MPa for the at least 5 minutes.

Embodiment 18

The method of any one of Embodiments 14 through 17, wherein the layer of insulating material is treated with an impregnated resin.

Embodiment 19

The method of Embodiment 18, wherein the impregnated resin is a solvent-borne epoxy.

Embodiment 20

The method of any one of Embodiments 14 through 19, wherein the layer of insulating material substantially does not degrade when exposed to one or more of a boric acid spray and a sodium hydroxide spray.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims which follow.

What is claimed is:

1. A method of operating a nuclear reactor, comprising:
    operating a valve actuator to open and close a valve in fluid communication with a nuclear reactor fluid control system; and
    driving the valve actuator with an electric motor by rotating an armature of the electric motor with windings of magnet wires of the electric motor, each individual wire of windings of the magnet wires comprising a respective layer of insulating material disposed over and around a conductor of each individual wire, the layer of insulating material comprising polyetheretherketone (PEEK), the layer of insulating material having a thickness between about 0.025 mm and about 0.381 mm and configured to protect functionality of the windings, each of the windings of the magnet wires being directly treated with an impregnating resin after the windings of the magnet wires are formed and wound, the impregnating resin configured to act as a binding agent for structural integrity and provide a barrier to at least one harsh environment in order to at least partially reduce degradation of the layer of insulating material for of the windings of the magnet wires.

2. The method of claim 1, further comprising selecting the layer of insulating material to protect functionality of the windings when the motor is exposed to temperatures between about 120 degrees Celsius and about 260 degrees Celsius for at least about 5 minutes in a 100 percent humidity environment.

3. The method of claim 1, wherein the layer of insulating material of each individual wire of the windings substantially circumferentially and longitudinally envelopes the conductor of the individual wire.

4. The method of claim 1, further comprising selecting the impregnating resin to comprise a solvent-borne epoxy.

5. The method of claim 1, further comprising selecting the layer of insulating material to comprise a material that substantially does not degrade when exposed to one or more of a boric acid spray or a sodium hydroxide spray.

6. A method of refurbishing a nuclear reactor fluid system, comprising:
    replacing a valve actuator motor of a valve actuator of a valve, the valve configured to be in fluid communication with a nuclear reactor fluid control system, replacing the valve actuator motor comprising:
    uncoupling a motor from the valve actuator; and
    coupling a second motor to the valve actuator, the second motor being an electric motor, the second motor having coil windings of magnet wire, the magnet wire comprising a layer of insulating material disposed over a conductor, the layer of insulating material comprising polyetheretherketone (PEEK), the layer of insulating material having a thickness between about 0.025 mm and about 0.381 mm and configured to protect functionality of the coil windings when the motor is exposed to temperatures between about 120 degrees Celsius, each individual wire of the coil windings comprising a respective layer of insulating material disposed over and around a conductor of each individual wire, each of the coil windings being individually treated with a resin after the coil windings have been formed and wound, the resin on the coil windings to increase structural integrity of the coil windings with the resin that acts as a binding agent for the coil windings and to provide a barrier with the resin on the coil windings to at least partially reduce degradation of the layer of insulating material.

7. The method of claim 6, further comprising selecting each individual wire to comprise the layer of insulating material extruded along the conductor of each individual wire.

8. The method of claim 6, further comprising designing the valve to be used inside a containment unit of a nuclear reactor of the nuclear reactor fluid control system.

9. The method of claim 6, further comprising selecting the motor to comprise a direct current (DC) compound wound electric motor.

10. The method of claim 9, furthering comprising selecting the windings of the electric motor to include field coil windings of magnet wire and armature coil windings of magnet wire, wherein the layer of insulating material is disposed on the conductor of the field coil windings and the conductor of the armature coil windings.

11. The method of claim 6, further comprising selecting the motor as an alternating current (AC) three-phase electric motor.

12. A method of servicing a nuclear reactor fluid system, comprising:
    coupling a valve actuator to a valve, the valve in fluid communication with a nuclear reactor fluid control system, the valve actuator comprising:
    a rotatable shaft for actuating a portion of a valve in fluid communication with a nuclear reactor fluid control system; and
    an electric motor, comprising:
        a frame;
        windings of magnet wire disposed in the frame, each magnet wire of the windings of magnet wire comprising a layer of insulating material disposed over a conductor of the magnet wire;
        an armature coupled to the rotatable shaft, the windings of magnet wire each comprising the layer of insulating material disposed directly over the conductor of the magnet wire, the windings of magnet wire configured to define a magnetic field to rotate the armature and the rotatable shaft when electric current is supplied to the windings of magnet wire, the layer of insulating material disposed directly over each conductor of the windings of magnet wire to at least partially isolate the conductor of the windings of magnet wire from a harsh operational environment of the nuclear reactor fluid system; and an impregnating resin disposed on each of the windings of magnet wire after the windings of magnet wire are formed and wound.

13. The method of claim 12, wherein the layer of insulating material is configured to protect functionality of the windings of magnet wire when the motor is exposed to temperatures between about 120 degrees Celsius and about 260 degrees Celsius for at least about 5 minutes in a 100 percent humidity environment.

14. The method of claim 12, wherein the layer of insulating material of each conductor of the windings of magnet wire is treated with the impregnating resin that is configured to act as a binding agent for structural integrity.

15. The method of claim 12, wherein the impregnating resin is a solvent-borne epoxy.

16. The method of claim 12, wherein the layer of insulating material is configured to not substantially degrade when exposed to one or more of a boric acid spray and a sodium hydroxide spray.

17. The method of claim 12, further comprising selecting the impregnating resin to act as a binding agent for structural integrity and to provide a barrier to at least one harsh environment in at least partially reduce degradation of the layer of insulating material for the windings of magnet wire.

18. The method of claim 12, further comprising selecting the layer of insulating material of each conductor of the windings of magnet wire to substantially circumferentially and longitudinally envelope the conductor.

19. The method of claim 12, further comprising selecting the windings of the electric motor to include field coil windings formed of magnet wire and armature coil windings formed of magnet wire, the layer of insulating material being disposed on the conductor of the field coil windings and the conductor of the armature coil windings.

* * * * *